(12) United States Patent
Azuchi

(10) Patent No.: US 7,796,288 B2
(45) Date of Patent: Sep. 14, 2010

(54) PRINTER CONTROL APPARATUS, PRINTER CONTROL METHOD, AND COMPUTER READABLE RECORDING MEDIUM STORED WITH COMPUTER PROGRAM FOR CONTROLLING PRINTER

(75) Inventor: Juntaro Azuchi, Setagaya-ku (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1135 days.

(21) Appl. No.: 11/359,391

(22) Filed: Feb. 23, 2006

(65) Prior Publication Data
US 2007/0103719 A1 May 10, 2007

(30) Foreign Application Priority Data
Nov. 9, 2005 (JP) .............................. 2005-325295

(51) Int. Cl.
*G06F 3/12* (2006.01)
*G06K 15/00* (2006.01)

(52) U.S. Cl. ...................... 358/1.15; 358/1.13; 358/1.16

(58) Field of Classification Search .................. 358/1.1, 358/1.2, 1.4, 1.6, 1.11, 1.13, 1.14, 1.15, 1.16, 358/1.17, 1.18, 401, 407, 448, 450, 468; 345/594, 630, 635, 156, 1.1, 4, 30; 715/200, 715/201, 202, 274, 277, 700, 762; 710/15, 710/8, 62, 72; 347/2, 3, 5, 14, 23; 399/1, 399/8, 9
See application file for complete search history.

(56) References Cited

U.S. PATENT DOCUMENTS

| 6,115,133 A | * | 9/2000 | Watanabe .................. 358/1.15 |
| 2002/0120742 A1 | | 8/2002 | Cherry |
| 2003/0233488 A1 | * | 12/2003 | Ozaki et al. ................. 709/321 |
| 2005/0180791 A1 | * | 8/2005 | Kujirai ........................ 400/61 |
| 2005/0190395 A1 | * | 9/2005 | Aritomi ..................... 358/1.13 |

FOREIGN PATENT DOCUMENTS

| JP | 06-161685 | 6/1994 |
| JP | 2001-331396 | 11/2001 |
| JP | 2002-351631 | 12/2002 |

OTHER PUBLICATIONS

Official Action for Decision of Refusal in JP 2005-325296 dated Sep. 9, 2008, and English Translation thereof.
Notification of Reasons for Refusal in JP 2005-325295 dated May 27, 2008, and English Translation thereof.

* cited by examiner

*Primary Examiner*—Dov Popovici
(74) *Attorney, Agent, or Firm*—Buchanan Ingersoll & Rooney PC

(57) ABSTRACT

An operating screen including a printing setup screen containing the setup items of printing conditions that a user can select is provided to the user. Further, a result of searching for printers that match the values of the setup items is arranged on the printer selection screen within the operating screen, and a "Print" button is arranged on the operating screen for the user to operate for instructing a printer displayed as the result of the search.

17 Claims, 13 Drawing Sheets

| No. | Printer information item | Remarks |
|---|---|---|
| 1 | Service ID | Character string |
| 2 | Company name | |
| 3 | Model name | |
| 4 | Model number | |
| 5 | Organization name | |
| 6 | UUID | ID for identifying device (unique to each device) |
| 7 | URL for acquiring attributive information | |
| 8 | Service name | |
| 9 | Service accessible/not accessible | |
| 10 | Type of service | |
| 11 | Device status | |
| 12 | Default value for single side/double side | |
| 13 | Type of supported single side/double side printing | |
| 14 | Default value of printing orientation | |
| 15 | Supported printing orientation | Vertical/Horizontal |
| 16 | Default value of resolution | |
| 17 | Supported resolution | |

| No. | Printer information item | Remarks |
|---|---|---|
| 18 | Default value of printing color | |
| 19 | Supported printing color | Color/Monochromatic |
| 20 | Default value of number of printed copies | |
| 21 | Supported number of printed copies | |
| 22 | Default value of finishing process supported | |
| 23 | Supported finishing process | |
| 24 | Default value of paper size | |
| 25 | Type of supported paper size | |
| 26 | Default value of supported N-up | |
| 27 | Type of supported N-up | |
| 28 | Default value of supported printing in each copy | |
| 29 | Type of supported printing in each copy | |
| 30 | Confidential printing applicable/not applicable | |
| 31 | Assigning method for password to be assigned in confidential printing | Method of client entering password/Method of server distributing password |
| 32 | PPM (monochromatic) | |
| 33 | PPM (color) | |
| 34 | Printing frequency | |

PRINTER CONTROL APPARATUS, PRINTER CONTROL METHOD, AND COMPUTER READABLE RECORDING MEDIUM STORED WITH COMPUTER PROGRAM FOR CONTROLLING PRINTER

CROSS-REFERENCE TO RELATED APPLICATION

This application is based on Japanese Patent Application No. 2005-325295 filed on Nov. 9, 2005, the contents of which are hereby relied on to correct possible errors in the present application.

BACKGROUND OF THE INVENTION

1. Field of the Invention

The present invention relates to a printer control apparatus, a printer control method, and a computer readable recording medium stored with a computer program for controlling a printer.

2. Description of the Related Art

A user can specify various setup items of printing conditions such as paper size and printing color, using a control program called a printer driver on a PC (personal computer) and transmit printing data on which such printing conditions are specified to a printer. A user can also select an output destination of printing data among a plurality of printers using a printer driver in a system where the printers are connected to a network.

However, there have been cases where it is impossible to execute printing desired by a user, for example, a printer selected by the user does not necessarily match a printing condition that the user wishes to specify, so that printing ends up being made on paper of a size different from the specified size.

In order to solve this problem, a printer selecting device is disclosed in which a list of printers is displayed by searching for the printers that match the printing conditions specified by a user so that the user can select one printer from the displayed list (see Unexamined Japanese Patent Publication No. JP-A-6-161685). This enables the user to select a printer that matches the desired printing conditions even when the user does not remember all the features such as the specification of each printer.

However, in case of the device disclosed in JP-A-6-161685, it only allows the user to specify a printer from the list of printers that matches the desired printing conditions. Therefore, in printing a document file, a user has to make a search of printers that match printing conditions first and then issue a printing instruction by specifying the printing conditions again.

In other words, it requires an independent operation for executing a printing process separate from an operation for searching printers that match the printing conditions, and the fact that the user has to go through cumbersome two stages of operations is a problem.

Objects And Summary

It is an object of the invention is to provide a printer control apparatus, a printer control method, and a computer readable recording medium stored with a computer program for controlling a printer, which are improved by solving the above mentioned problems.

It is another object of the present invention to provide a printer control apparatus, a printer control method, and a computer readable recording medium stored with a computer program for controlling a printer, that enable the user to execute printing on a printer that matches the printing conditions desired by the user with simple operations.

According to an embodiment of the invention, there is provided a printer control apparatus comprising a printer driver for controlling a printer connected to the printer control apparatus, wherein said printer driver is adapted to provide a user with an operating screen containing a plurality of setup items of printing conditions selectable by the user, said printer driver is adapted to search for a printer that matches the values of said setup items and to arrange a result of the search on said operating screen, and said printer driver is adapted to arrange on said operating screen a printing instruction part that can be operated by the user for instructing a printer indicated in the result of the search to print.

According to another embodiment of the invention, there is provided a method executed on a printer control apparatus for controlling a printer connected to the printer control apparatus, the method comprising: 1) providing a user with an operating screen containing a plurality of setup items of printing conditions selectable by the user; 2) searching for a printer that matches the values of said setup items and arranging a result of the search on said operating screen; and 3) arranging on said operating screen a printing instruction part that can be operated by the user for instructing a printer indicated in the result of the search to print.

According to still another embodiment of the invention, there is provided a computer readable recording medium stored with a computer program for controlling a printer connected to a printer control apparatus, said computer program causing a computer to execute a process comprising: 1) providing a user with an operating screen containing a plurality of setup items of printing conditions selectable by the user; 2) searching for a printer that matches the values of said setup items and arranging a result of the search on said operating screen; and 3) arranging on said operating screen a printing instruction part that can be operated by the user for instructing a printer indicated in the result of the search to print.

According to a further embodiment of the invention, there is provided a printer control apparatus comprising a printer driver for controlling a printer connected to the printer control apparatus, wherein said printer driver is adapted to provide a user with an operating screen containing a plurality of setup items of printing conditions selectable by the user; said printer driver is adapted to search for a printer using the values of said setup items selected by the user as searching conditions and to provide the user with a result of the search; and said printer driver is adapted to reflect the values of the setup items used as the search conditions as the printing conditions on the printer presented to the user as a result of the search.

According to a still further embodiment of the invention, there is provided a method executed on a printer control apparatus for controlling a printer connected to the printer control apparatus, the method comprising: 1) providing a user with an operating screen containing a plurality of setup items of printing conditions selectable by the user; 2) searching for a printer using the values of said setup items selected by the user as searching conditions and providing the user with a result of the search; and 3) reflecting the values of the setup items used as the search conditions as the printing conditions on the printers presented to the user as a result of the search.

According to a yet further embodiment of the invention, there is provided a computer readable recording medium stored with a computer program for controlling a printer connected to a printer control apparatus, said computer program causing a computer to execute a process comprising: 1) providing a user with an operating screen containing a plurality of setup items of printing conditions selectable by the user; 2) searching for a printer using values of said setup items selected by said user as searching conditions and providing the user with a result of the search; and 3) reflecting the values of the setup items used as the search conditions as the printing conditions on the printers presented to the user as a result of the search.

The objects, features and characteristics of this invention other than those set forth above will become apparent from the description given herein below with reference to preferred embodiments illustrated in the accompanying drawings.

BRIEF DESCRIPTION OF THE DRAWINGS

FIG. 14 shows an example of the printer information items.

FIG. 15 shows the example of the printer information items continuing from FIG. 14.

DETAILED DESCRIPTION OF PREFERED EMBODIMENTS

An embodiment of this invention will be described below with reference to the accompanying drawings.

Figure 1:
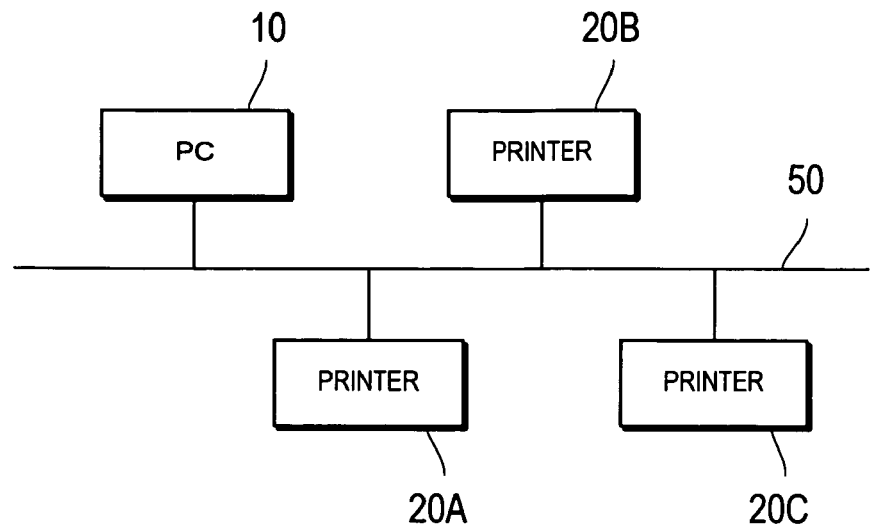
FIG. 1 is a block diagram showing the overall constitution of a printing system according to an embodiment of the present invention.

FIG. 1 is a block diagram showing the overall constitution of a printing system according to an embodiment of the present invention.

The printing system according to the present embodiment is equipped with a PC (personal computer) 10, and printers 20A, 20B and 20C. The PC 10 and the printers 20A, 20B and 20C are interconnected via network 50 so that they can communicate with each other.

The network 50 may consist of various networks such as a LAN connecting computers and network equipment according to standards such as Ethernet®, Token Ring, and FDDI, or a WAN that consists of several LANs connected by a dedicated line. The types and the number of equipment to be connected to the network 50 are not limited to those shown in FIG. 1.

Figure 2:
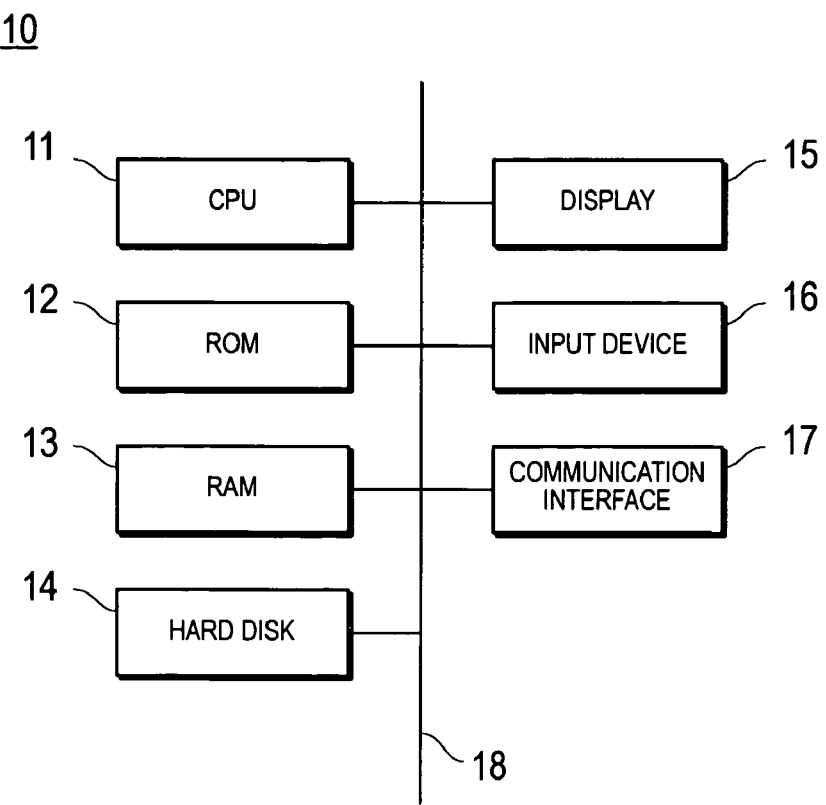
FIG. 2 is a block diagram showing the constitution of the PC shown in FIG. 1.

FIG. 2 is a block diagram showing the constitution of the PC 10 shown in FIG. 1. The PC 10 contains a CPU 11, a ROM 12, a RAM 13, a hard disk 14, a display 15, an input device 16, and a communication interface 17, all of which are interconnected by a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

The display 15 is typically a CRT or a LCD and displays various kinds of information. The input device 16 consists of pointing devices such as a mouse, a keyboard, and others, and is used for making various kinds of inputs.

The communication interface 17 is an interface for communications between other equipment, such as printers 20A, 20B and 20C, for which various local connection interfaces, e.g., network interfaces such as Ethernet®, Token Ring, and FDDI standards, serial interfaces such as USB and IEEE 1394, parallel interfaces such as SCSI, IEEE 1284, and wireless communication interfaces such as Bluetooth®, IEEE 802.11, HomeRF®, IrDA®, as well as telephone circuit interfaces for connection to telephone circuits can be used.

An application for preparing and editing a document file and a printer driver are installed on the hard disk 14. The printer driver is used to set up various items of the printing conditions based on the user's operations using the operating screen to be described later and to generate printing data of a format that can be processed by the printer based on the data provided by the application for preparing and editing a document file. Therefore, the PC 10 can function as a printer control apparatus.

The PC 10 can include components other than those components mentioned above, or can lack some of the components mentioned above.

The printers 20A, 20B, and 20C execute printing processes based on the printing data received from the PC 10. The printers 20A, 20B, and 20C transmit various responses to the PC 10 based on requests or inquiries received from the PC 10.

Next, the printing instruction process on the PC 10 will be described below referring to FIG. 3 through FIG. 8. The algorithm shown in the flowcharts of FIG. 3 through FIG. 8 is stored as a program in a storage unit such as the hard disk 14 of the PC 10 and executed by CPU 11.

When the printer driver is started through the application for preparing and editing a document file, an operating screen is displayed on the display 15 for a user (S101).

Figure 9:
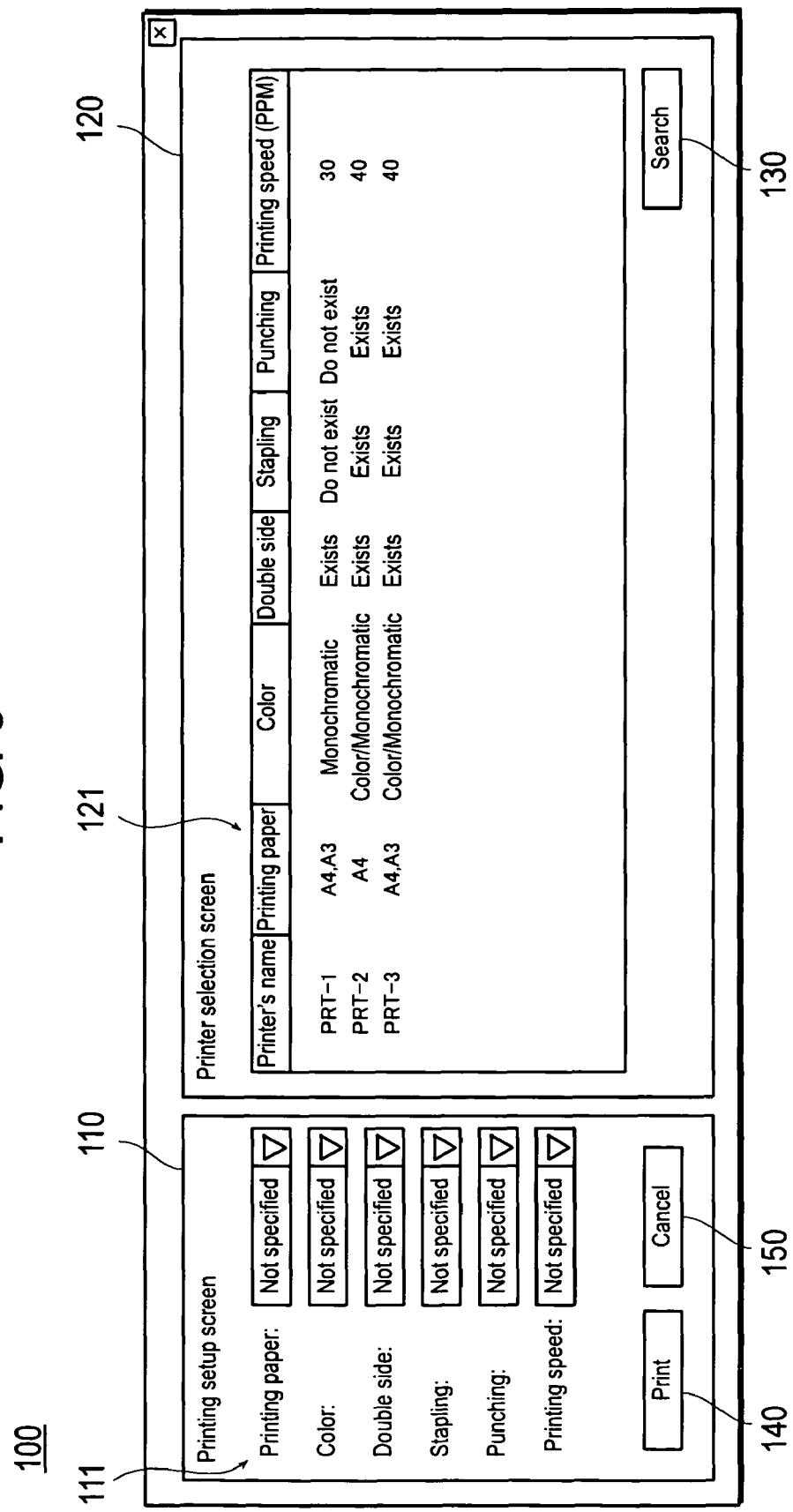
FIG. 9 shows an example of the operating screen.

FIG. 9 shows an example of the operating screen. An operating screen 100 includes a printing setup screen 110 containing setup items 111 of the printing conditions that can be selected by the user and a printer selection screen 120 containing a printer information display area 121 in which printer information that can be selected by the user as the printing data output destination is displayed.

As the printing condition setup items 111, a plurality of items is displayed on the printing setup screen 110. More specifically, the setup items 111 of the printing conditions include "Paper," "Color," "Double Side," "Stapling, " "Punching, " and "Printing Speed" as shown in FIG. 9. As for the item of "Paper," the paper size used for printing can be specified. As for the item of "Color," either monochromatic or color can be specified as the printing color. As for the item of "Double Side," whether it is printed on both sides or not is specified. As for the item of "Stapling," whether the bundle of paper after printing is stapled or not is specified. As for the item of "Punching," whether a hole is punched or not in the bundle of paper after printing is specified. "Stapling" and "Punching" are the finishing processes provided for paper after printing. As for the item of "Printing Speed," the number of pages to be printed per minute is specified (PPM: Page PerMinute). However, the items of the printing conditions are not limited to the above. As can be seen from the above, the "value" in the setup items is not simply a numerical value but rather a concept that includes each item of selectable options.

The printing setup screen 110 contains a "Cancel" button 150 for canceling the entire specified printing conditions and a "Print" button 140 for instructing printing on the selected printer. On the other hand, the printer selection screen 120 contains a "Search" button 130 for instructing search of printers connected on the network 50.

Therefore, the user can specify a printing condition, search a printer, select a printer to be used, and instruct printing on a selected printer through the operating screen 100. The specified printing conditions are saved in a storage unit such as the hard disk 14, and the saved values will be displayed next time when the printer driver is turned on.

In the step S102, a judgment is made as to whether at least one of the following is satisfied or not when the printer driver is turned on or the "Search" button 130 is depressed (S102). If neither the printer driver is turned on nor the "Search" button 130 is depressed (S102: No), the program advances to the step S105.

If either the printer driver is turned on or the "Search" button 130 is depressed (S102: Yes), the printer search process is executed (S103).

Figure 4:
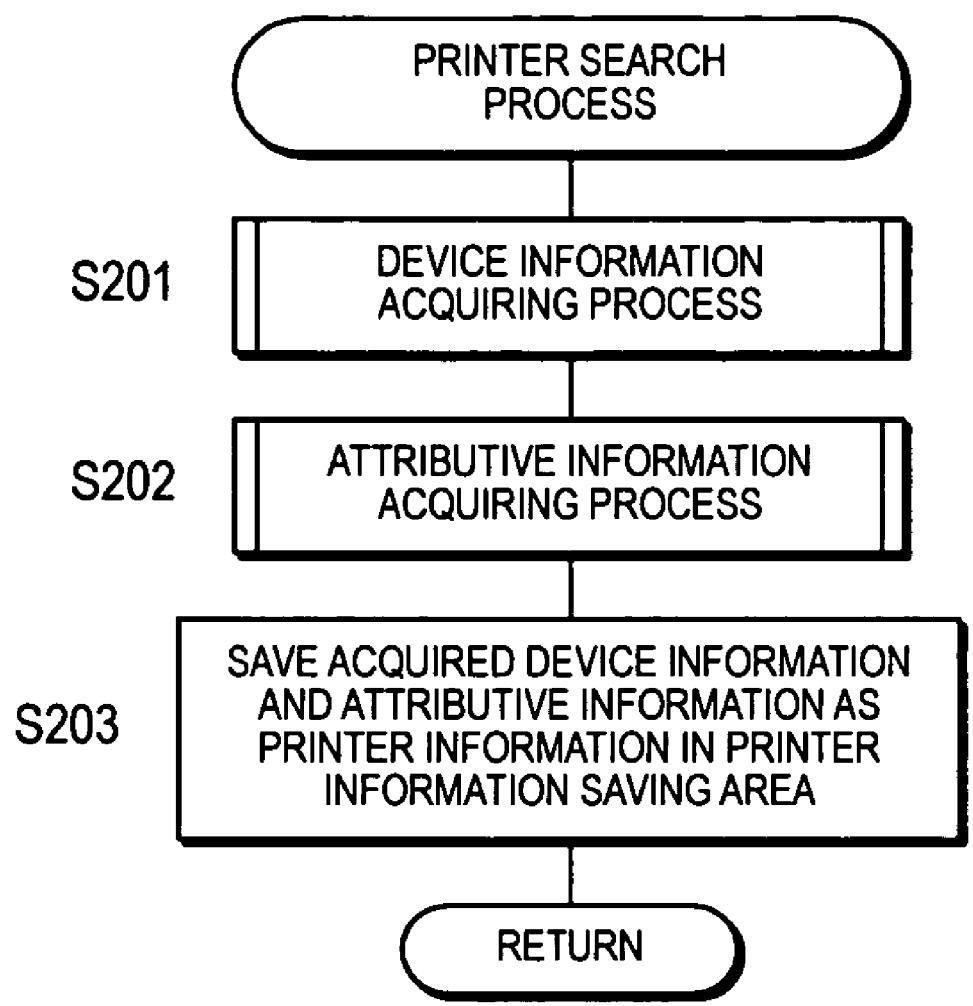
FIG. 4 is a flowchart showing the sequence for the printer search process.

FIG. 4 is a flowchart showing the process for the printer search process. In the printer search process, the device information acquisition process is executed (S201) The device information here is information described concerning a printer.

Figure 5:
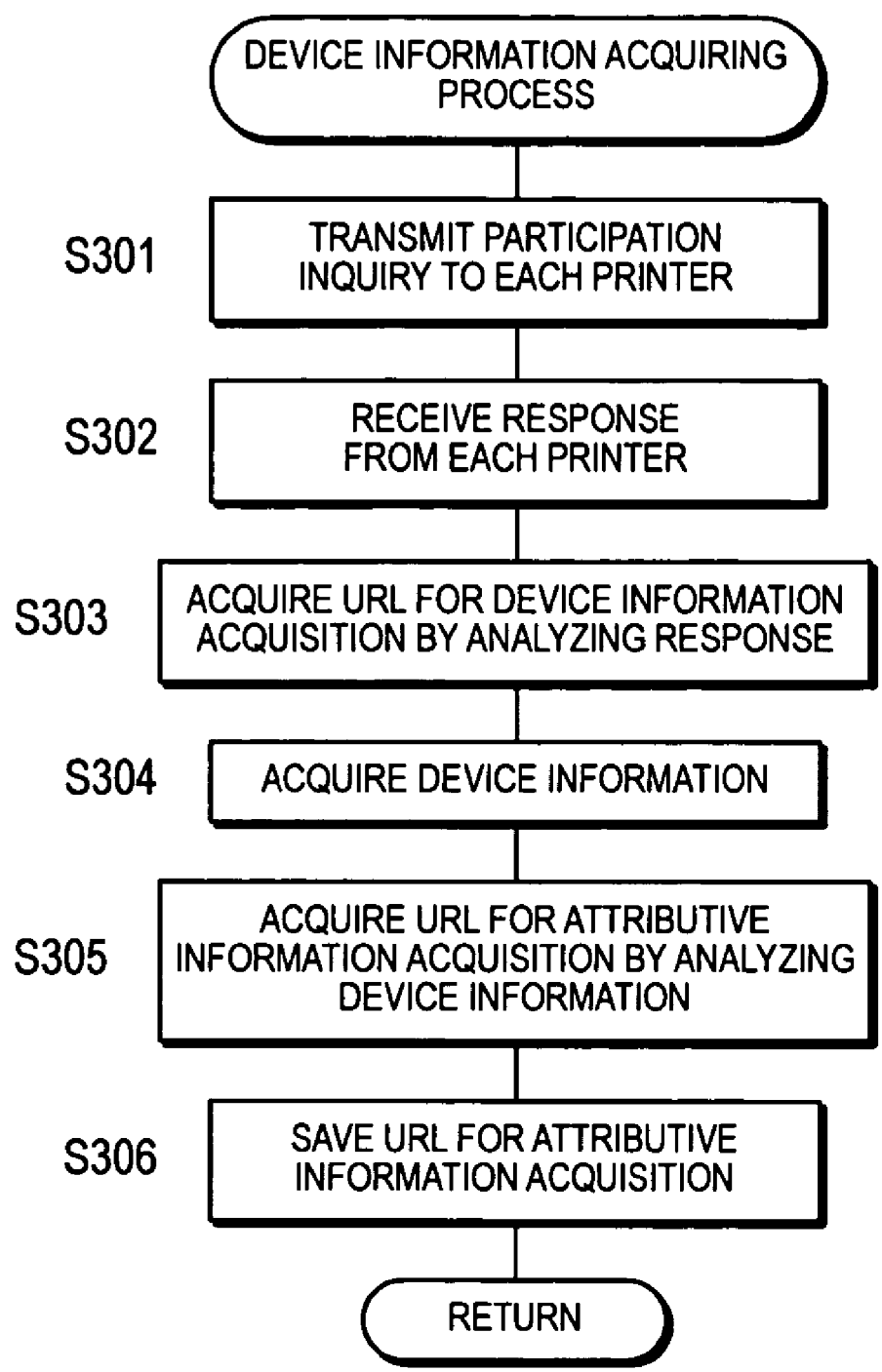
FIG. 5 is a flowchart showing the sequence of the acquisition process for the device information.

In the device information acquisition process with reference to FIG. 5, a query is issued first to each printer connected on the network 50 inquiring whether the printer participates as a candidate printer to be used in printing or not (S301).

Next, a response acknowledging the participation is received from each printer (S302), and the URL (Uniform Resource Locators) to be used in the acquisition of the device information is acquired by analyzing each response (S303). The URL for the device information acquisition indicates the location of the particular device information. The device information is saved in each printer. However, the device information of all printers can be jointly saved in equipment such as a server on the network 50.

The device information is obtained by transmitting a command requesting the device information to be sent to the acquired URL (S304).

Further, the URL to be used for acquiring attributive information is obtained by analyzing the device information (S305). The attributive information is the information of attributes that the printing service provided by the printer has, and the URL for acquiring the attributive information shows the location of the attributive information. The obtained URL for acquiring the attributive information is stored in the hard disk 14 (S306).

Next, getting back to the flowchart shown in FIG. 4, the process of acquiring the attributive information is executed in the step S202.

Figure 6:
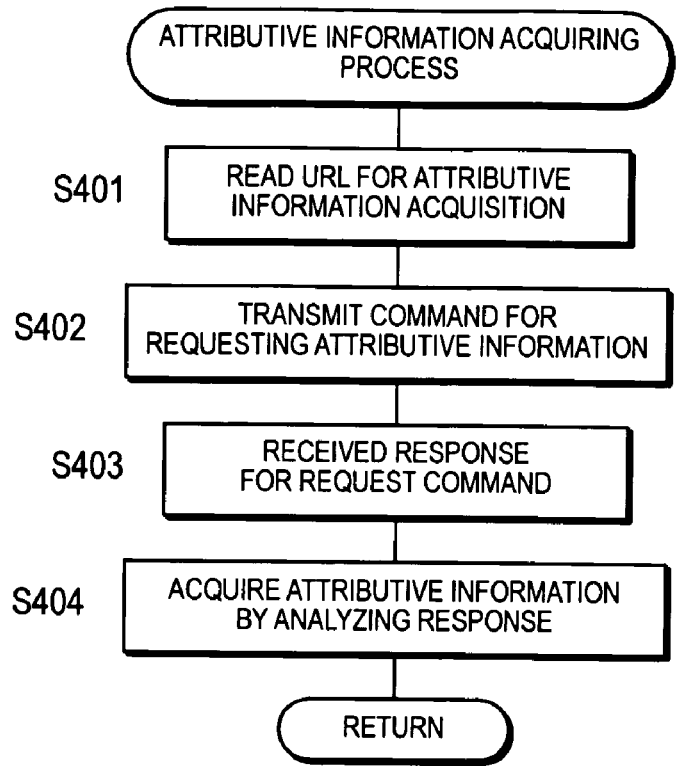
FIG. 6 is a flowchart showing the sequence of the acquisition process for the attributive information.

With reference to FIG. 6, in the process of acquiring the attributive information, the URL for acquiring the attributive information is read from the hard disk 14 to the RAM 13 (S401).

Next, the request command for the attributive information is transmitted to the URL read into the RAM 13 (S402), and the response for the particular request command is received (S403).

The attributive information is acquired by analyzing the received response (S404). The attributive information is saved in each printer. However, the attributive information of all printers can be jointly saved in equipment such as a server on the network 50.

Next, getting back to the flowchart of FIG. 4, the device information and the attributive information thus acquired are saved in the hard disk 14 as the printer information in the step S203. If the previously acquired printer information is already saved, the contents are updated. A part of the acquired information may be saved in the hard disk 14 as the printer information.

Figure 13:
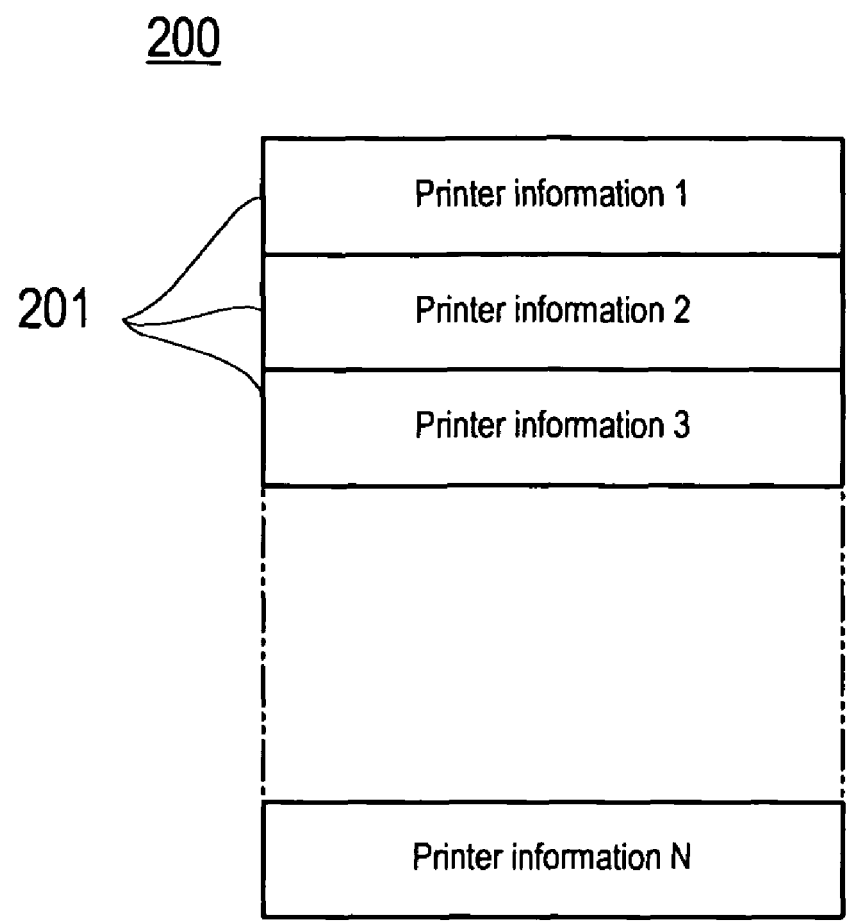
FIG. 13 shows the printer information in the printer information saving area.

As shown in FIG. 13, printer information 201 is saved by each printer in a printer information saving area 200 of the hard disk 14.

FIG. 14 and FIG. 15 shows an example of the printer information items. The printer information 201 contains device information shown in Nos. 1 through 7 and attributive information shown in Nos. 8 through 33. No. 34, "Printing frequency," represents the frequency a printer is used. The frequency the printer is used can be, for example, the number of printing jobs or the number of pages printed in the total period of the past or during a certain period of time. The printer information 201 can include components other than those components shown in the diagram, or can lack some of the components shown there.

Now getting back to the flowchart shown in FIG. 3 again, the process of displaying printers that match the printing conditions in the step S104.

Figure 7:
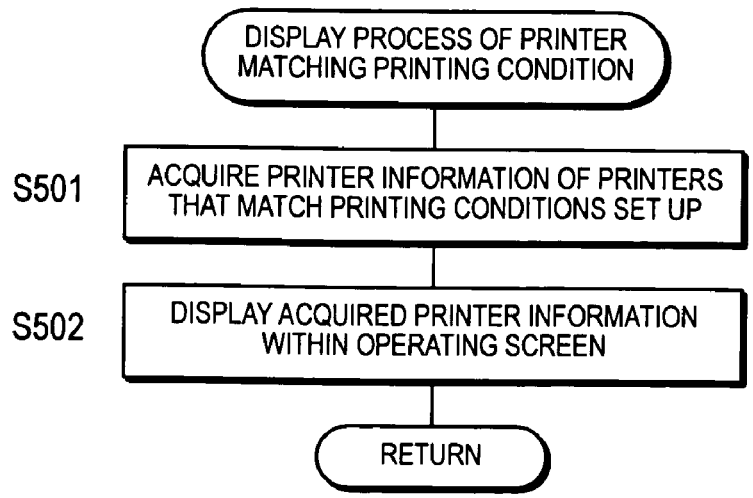
FIG. 7 is a flowchart showing the sequence of the displaying process for the printers that match the specified printing conditions.

FIG. 7 is a flowchart showing the sequence of the displaying process for the printers that match the specified printing conditions. In the process of displaying the printers that match the printing conditions, the printing conditions that are set up using the printing setup screen 110 in the operating screen 100, in other words, the printers that match the setup items 111 of the printing conditions, are searched, and the printer information for the printers that match the printing conditions obtained as a result of the search are obtained from the printer information saving area 200 (S501).

Next, the search result in the step S501, in other words, the printer information acquired in the step S501, is displayed in the printer information display area 121 of the printer selection screen 120 in the operating screen 100 (S502). However, if there is no printer that matches the printing conditions, no printer information will be displayed in the printer information display area 121. If the previous search result is already displayed, the contents will be updated. If a plurality of printers is displayed as the search result, the information of the printers is arranged in the order of higher frequencies of use. Such an arrangement makes it more useful for the user's selection operation.

More preferably, only the items of the printer information that correspond to the setup items 111 of the printing conditions are extracted to be displayed in the printer information display area 121 as shown in FIG. 9.

FIG. 9 shows the operating screen 100 when all the set up items 111 of the printing conditions are "Not specified." In this case, the printer information of all the printers 20A, 20B, and 20C that are connected to the network 50 and can be used is displayed. In FIG. 9, the names of the printers 20A, 20B, and 20C are "PRT-1," "PRT-2," and "PRT-3" respectively.

Figure 10:
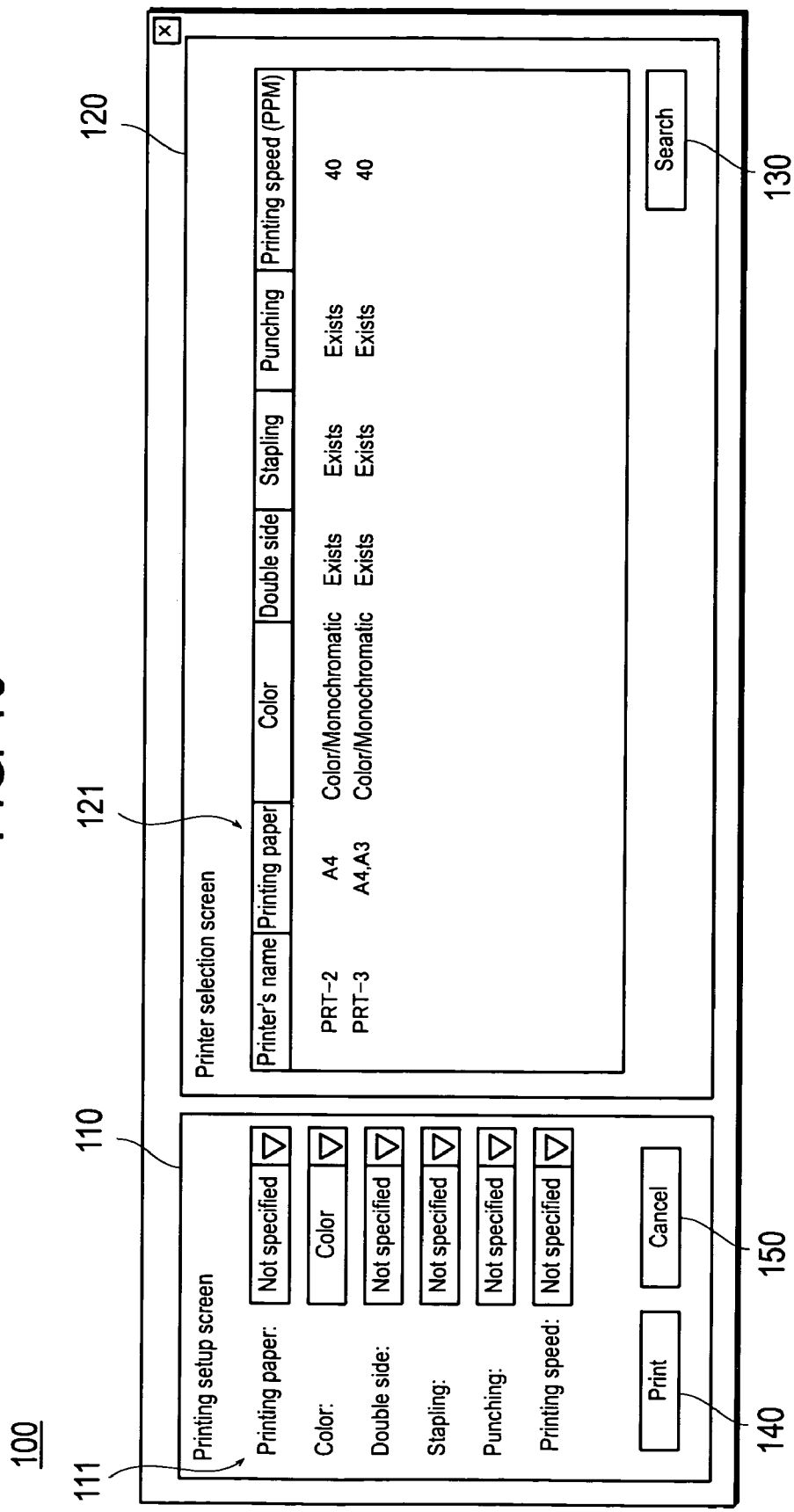
FIG. 10 shows an operating screen when "Color" is specified as a "Color" identification which is one of the printing condition setup items.

FIG. 10 shows an operating screen 100 when "Color" is specified as a "Color" identification which is one of the printing condition setup items 111. In this case, only the printer information of the printers 20B and 20C that support "Color" as a printing color is displayed in the printer information display area 121 of the printer selection screen 120.

Figure 11:
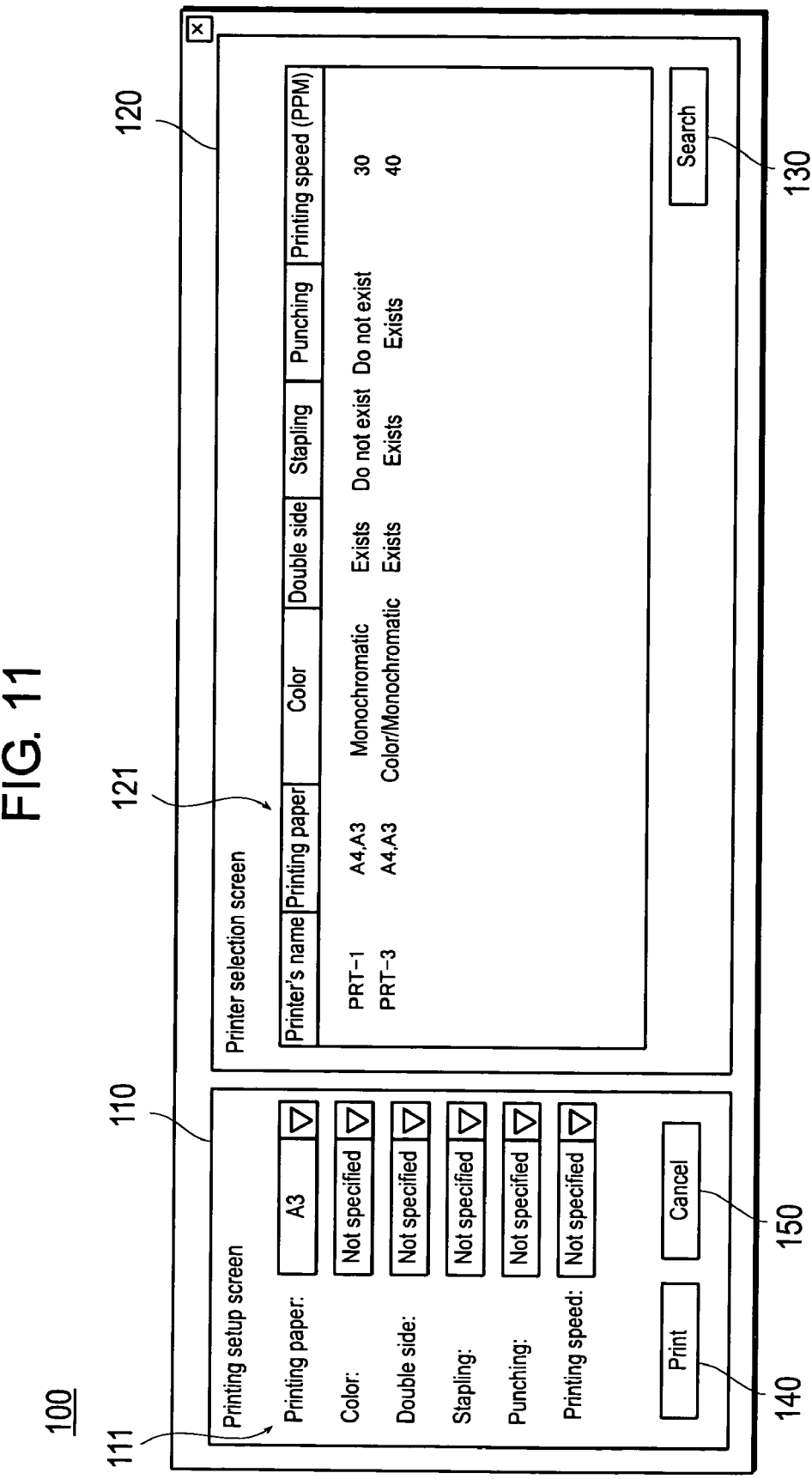
FIG. 11 shows an operating screen when "A3" is specified as a "Paper" identification which is one of the printing condition setup items.

FIG. 11 shows an operating screen 100 when "A3" is specified as a "Paper" identification which is one of the printing condition setup items 111. In this case, only the printer information of the printers 20A and 20C that support "A3" as a printing paper size is displayed in the printer information display area 121 of the printer selection screen 120.

Figure 12:
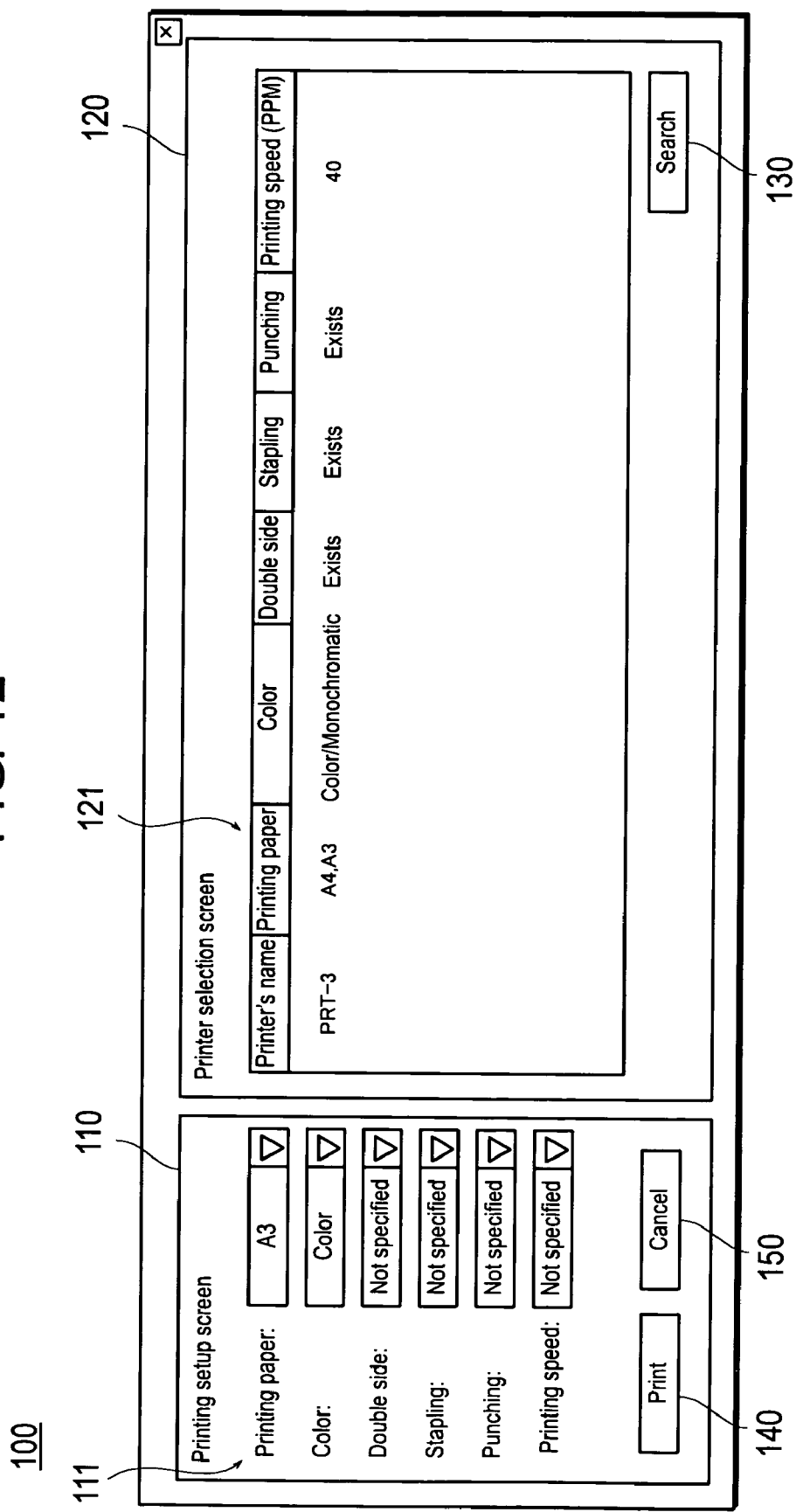
FIG. 12 shows an operating screen when "Color" is specified as a "color" identification and "A3" is specified as a "Paper" identification, which are a few of the printing condition setup items.

FIG. 12 shows an operating screen 100 when "Color" is specified as a "color" identification and "A3" is specified as a "Paper" identification, which are the printing condition setup items 111. In this case, only the printer information of the printer 20C that supports "Color" as a printing color and "A3" as a printing paper size is displayed in the printer information display area 121 of the printer selection screen 120.

Thus, the user can efficiently select the printer that should be used as the output destination for the particular printing data among a plurality of printers that match the printing conditions displayed in the printer information display area 121 of the printer selection screen 120. The selection of a printer is done by clicking the part of the printer selection screen 121 where the information of the particular printer is displayed.

Figure 3:
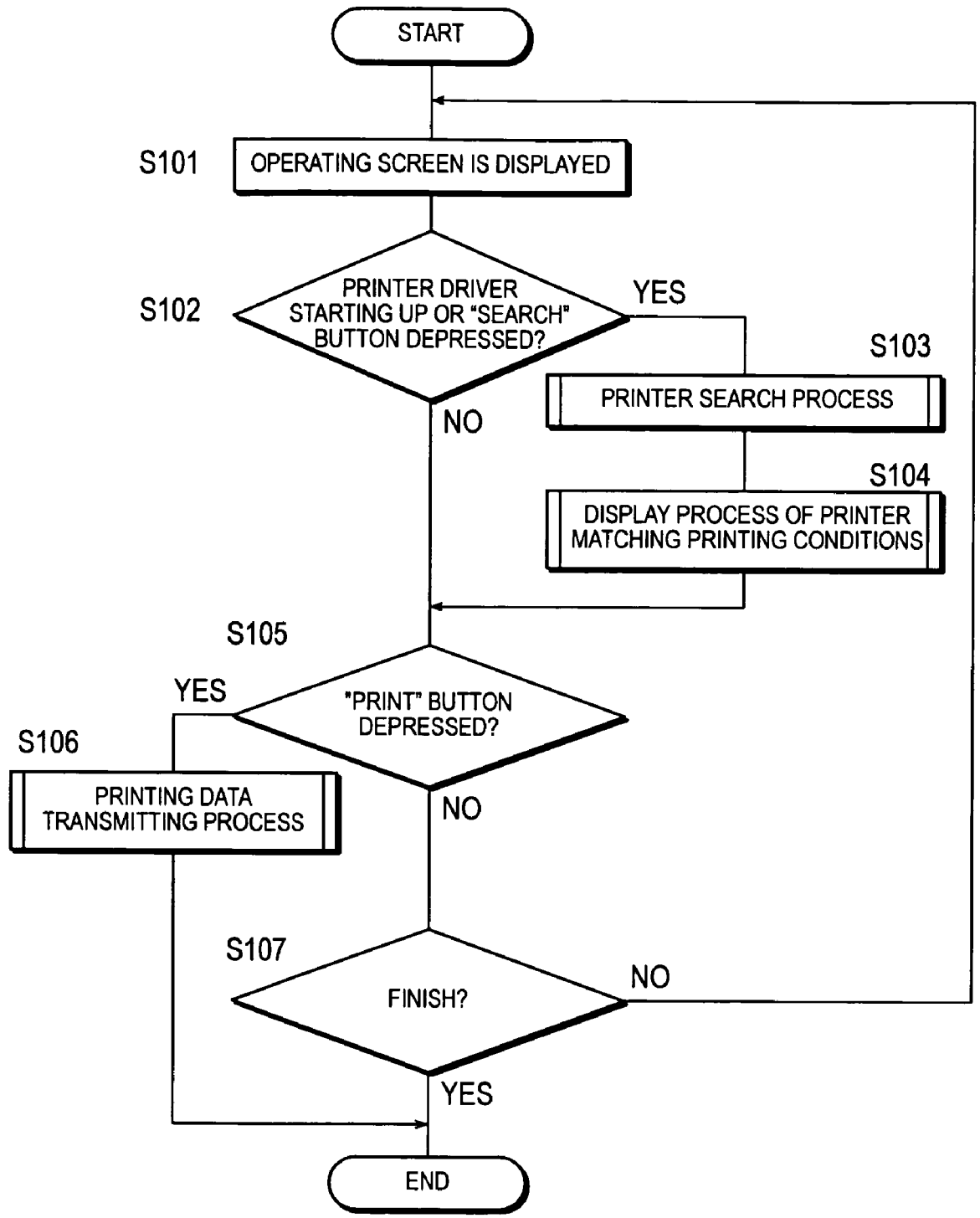
FIG. 3 is a flowchart showing the sequence for the printing instruction process on the PC.

Next, getting back to the flowchart of FIG. 3, a judgment is made as to whether the "Print" button 140 in the operating screen is depressed or not in the step S105. If the "Print" button 140 is not depressed (S105: No), the program advances to the step S107.

When the "Print" button 140 is depressed (S105: Yes), the printing data transmission process is executed (S106)

Figure 8:
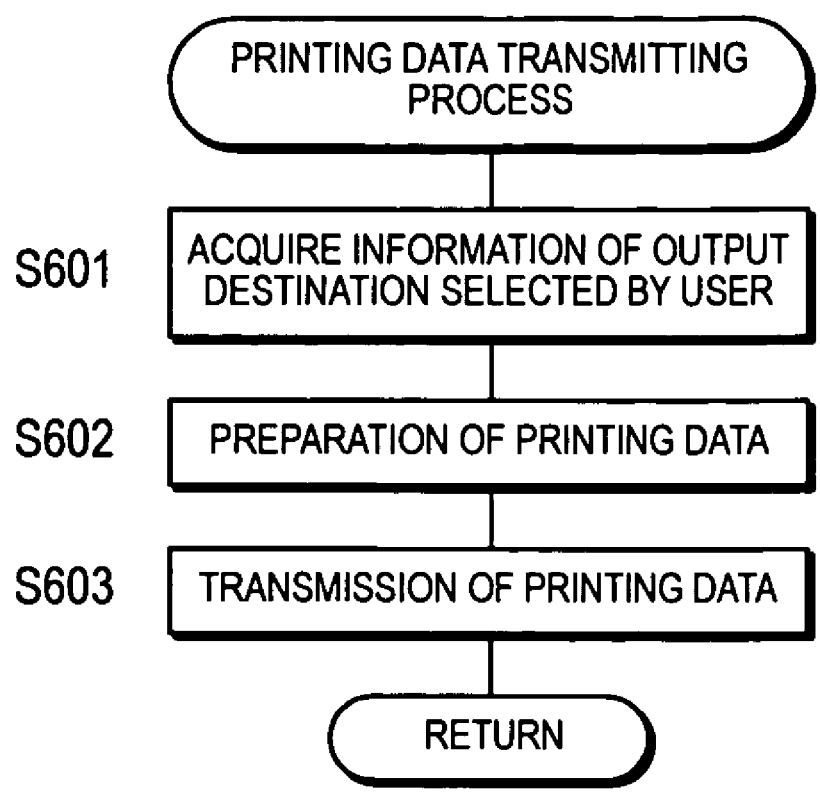
FIG. 8 is a flowchart showing the sequence of the transmission process for the printing data.

With reference to FIG. 8, the information concerning the output destination of the printing data selected by the user on the printer selection screen 120 in the operating screen 100 is acquired in the printing data transmission process (S601).

If no output destination is selected by the user, the printer displayed at the top of the list of a plurality of printers displayed in the printer information display area 121 of the printer selection screen 120 is considered to be as the one selected as the output destination. If only one printer is displayed in the printer information area 121, said printer is considered to be selected as the output destination. However, it can also be configured in such a way that, if no output destination is selected by the user, either the process in FIG. 8 is completed as is or the "Print" button 140 in the operating screen 100 is made inoperable.

Next, printing data of a format that can be understood by printers is prepared based on the document file prepared by the application for preparing and editing a document file (S602). Here, the printing data includes the data of the printing conditions setup.

Next, the prepared printing data is transmitted to the printer specified as the output destination (S603). Here, the value of the "Printing frequency" in the printer information concerning the particular printer is updated. The printer specified as the output destination performs the printing process based on the received printing data.

Next, getting back to the flowchart of FIG. 3, a judgment is made as to whether the user's termination instruction is received or not for terminating the printing instruction for the PC 10 in the step S107. If the termination instruction is not received (S107: No), the program returns to the step S101, and if the termination instruction is received (S107: Yes), the printing instruction process on the PC 10 shown in FIG. 3 is terminated.

As seen in the above, the operating screen 100 including the printing setup screen 110 containing the setup items 111 of the printing conditions that the user can select is provided for the user in this embodiment. Further, the result of searching printers that match the values of the setup items 111 is displayed on the printer selection screen 120 in the operating screen 100, and the "Print" button 140 is provided on the operating screen 100 for the user to operate for instructing a printer displayed as the search result.

Thus, the user can execute operations to search for printers that match the printing conditions and to instruct a printing process selecting a printer to be used on the same operating screen 100. This makes it possible for a user to execute printing on a printer that matches the printing conditions desired by the user with simple operations.

It is obvious that this invention is not limited to the particular embodiments shown and described above but may be variously changed and modified without departing from the technical concept of this invention.

Although the printer search process (S103) and the display process (S104) for displaying printers that match the printing conditions are executed, when the printer driver is started or when the "Search" button 130 is depressed (S102: Yes) in the embodiment described above, the present invention is not limited to it.

For example, it can be so configured that the printer search process (S103) and the display process (S104) for displaying printers that match the printing conditions are executed only when the "Search" button 130 is depressed. As an alternative, it can also be so configured that the printer search process (S103) and the display process (S104) for displaying printers that match the printing conditions are executed when the printer driver is started, and the display process (S104) for displaying printers that match the printing conditions are executed, skipping the printer search process (S103), when the "Search" button 130 is depressed.

As another alternative, it can also be so configured that the search result in the printer information display area 121 of the printer selection screen 120 in the operating screen 100 is updated each time when the values of the setup items 111 of the printing conditions are changed. In this case, the printer search process (S103) and the display process (S104) for displaying printers that match the printing conditions can be executed, or only the display process (S104) for displaying printers that match the printing conditions can be executed skipping the printer search process (S103), each time when the values of the setup items 111 of the printing conditions are changed.

In yet another embodiment, the printer driver provides a user with an operating screen containing a plurality of setup items of printing conditions that are selectable by the user, while the printer driver also provides the user with a result of search by searching printers using the values of setup items selected by the user as the search conditions. The printer driver reflects the values of the setup items used as the search conditions as the printing conditions on the printers presented to the user as a result of the search. According to such embodiments, the user does not need to set up duplicate printing conditions, one for printer search and the other for printing on the printer based on the search result, so that the user can execute printing on a printer matching the printing conditions desired by the user with simple operations.

The term "printer" is used as a device in general for printing the printing data on a recording medium such as paper. Therefore the term "printer" represents a concept that includes various image forming devices such as a copying machine or an MFP (Multi-Function Peripheral).

The means and method of conducting various processes in the printer control apparatus according to the present invention can be realized by means of a dedicated hardware circuit or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the printer control apparatus as a part of its function.

What is claimed is:

1. A printer control apparatus comprising a printer driver for controlling a printer connected to the printer control apparatus, wherein
    said printer driver is adapted to provide a user with an operating screen containing a plurality of setup items of printing conditions selectable by the user,
    said printer driver is adapted to search for a printer that matches the values of said setup items and to arrange a result of the search on said operating screen, and
    said printer driver is adapted to arrange on said operating screen a printing instruction part that can be operated by the user for instructing a printer indicated in the result of the search to print;
    wherein said operating screen simultaneously displays said plurality of setup items of printing conditions selectable by the user, the result of the search, and the printing instruction part that can be operated by the user for instructing a printer indicated in the result of the search to print.

2. A printer control apparatus as claimed in claim 1, wherein if a plurality of printers exists in the result of the search, said printer driver is adapted to instruct one of the printers selected by the user to print.

3. A printer control apparatus as claimed in claim 1, wherein said printer driver is adapted to arrange on said operating screen a search instruction part that can be operated by the user to obtain the result of the search.

4. A printer control apparatus as claimed in claim 1, wherein said printer driver is adapted to update the search result on said operating screen each time when the values of said setup items are changed.

5. A printer control apparatus as claimed in claim 1, wherein if a plurality of printers exists in the result of the search, said printer driver is adapted to arrange the printers in the order of higher usage frequencies on said operating screen.

6. A printer control apparatus as claimed in claim 1, wherein said printer driver is adapted to obtain information concerning a printer from the printer connected to said printer control apparatus and searches for a printer that matches the values of said setup items based on said information.

7. A printer control apparatus as claimed in claim 1, wherein said printer driver is adapted to search for a printer that matches the values of said setup items that are selected by the user,
    the printer control apparatus further comprising a storage for saving the setup items selected by the user, and
    said printer driver is adapted to arrange on said operating screen a printing instruction part that can be operated by the user for instructing a printer indicated in the result of the search to print using the saved selected setup items.

8. A method executed on a printer control apparatus for controlling a printer connected to the printer control apparatus, the method comprising:
    1) providing a user with an operating screen containing a plurality of setup items of printing conditions selectable by the user;
    2) searching for a printer that matches the values of said setup items and arranging a result of the search on said operating screen; and
    3) arranging on said operating screen a printing instruction part that can be operated by the user for instructing a printer indicated in the result of the search to print;
    4) wherein said operating screen simultaneously displays said plurality of setup items of printing conditions selectable by the user, the result of the search, and the printing instruction part that can be operated by the user for instructing a printer indicated in the result of the search to print.

9. A non-transitory computer readable recording medium stored with a computer program for controlling a printer connected to a printer control apparatus, said computer program causing a computer to execute a process comprising:
    1) providing a user with an operating screen containing a plurality of setup items of printing conditions selectable by the user;
    2) searching for a printer that matches the values of said setup items and arranging a result of the search on said operating screen;
    3) arranging on said operating screen a printing instruction part that can be operated by the user for instructing a printer indicated in the result of the search to print; and
    4) wherein said operating screen simultaneously displays said plurality of setup items of printing conditions selectable by the user, the result of the search, and the printing instruction part that can be operated by the user for instructing a printer indicated in the result of the search to print.

10. A printer control apparatus comprising a printer driver for controlling a printer connected to the printer control apparatus, wherein
    said printer driver is adapted to provide a user with an operating screen containing a plurality of setup items of printing conditions selectable by the user;
    said printer driver is adapted to search for a printer using the values of said setup items selected by the user as searching conditions and to provide the user with a result of the search on said operating screen;
    said printer driver is adapted to reflect the values of the setup items used as the search conditions as the printing conditions on the printer presented to the user as a result of the search;
    said printer driver is adapted to arrange on said operating screen a printing instruction part that can be operated by the user for instructing a printer indicated in the result of the search to print; and
    wherein said operating screen simultaneously displays said plurality of setup items of printing conditions selectable by the user, the result of the search, and the printing instruction part that can be operated by the user for instructing a printer indicated in the result of the search to print.

11. A printer control apparatus as claimed in claim 10, wherein if a plurality of printers exists in the result of the search, said printer driver is adapted to instruct one of the printers selected by the user to print.

12. A printer control apparatus as claimed in claim 10, wherein said printer driver is adapted to arrange on said operating screen a search instruction part that can be operated by the user to obtain the result of the search.

13. A printer control apparatus as claimed in claim 10, wherein said printer driver is adapted to search for a printer that matches the values of said setup items each time when the values of said setup items are changed and to provide the user with a result of the search.

14. A printer control apparatus as claimed in claim 10, wherein if a plurality of printers exists in the result of the search, said printer driver is adapted to present the printers in the order of higher usage frequencies to the user.

15. A printer control apparatus as claimed in claim 10, wherein said printer driver is adapted to obtain information concerning a printer from the printer connected to said printer control apparatus and searches for a printer that matches the values of said setup items based on said information.

16. A method executed on a printer control apparatus for controlling a printer connected to the printer control apparatus, the method comprising:
1) providing a user with an operating screen containing a plurality of setup items of printing conditions selectable by the user;
2) searching for a printer using the values of said setup items selected by the user as searching conditions and providing the user with a result of the search on said operating screen;
3) reflecting the values of the setup items used as the search conditions as the printing conditions on the printer presented to the user as a result of the search;
4) arranging on said operating screen a printing instruction part that can be operated by the user for instructing a printer indicated in the result of the search to print; and
5) wherein said operating screen simultaneously displays said plurality of setup items of printing conditions selectable by the user, the result of the search, and the printing instruction part that can be operated by the user for instructing a printer indicated in the result of the search to print.

17. A non-transitory computer readable recording medium stored with a computer program for controlling a printer connected to a printer control apparatus, said computer program causing a computer to execute a process comprising:
1) providing a user with an operating screen containing a plurality of setup items of printing conditions selectable by the user;
2) searching for a printer using values of said setup items selected by said user as searching conditions and providing the user with a result of the search on said operating screen;
3) reflecting the values of the setup items used as the search conditions as the printing conditions on the printer presented to the user as a result of the search;
4) arranging on said operating screen a printing instruction part that can be operated by the user for instructing a printer indicated in the result of the search to print; and
5) wherein said operating screen simultaneously displays said plurality of setup items of printing conditions selectable by the user, the result of the search, and the printing instruction part that can be operated by the user for instructing a printer indicated in the result of the search to print.

* * * * *